United States Patent [19]

Tsunekawa et al.

[11] 4,095,242
[45] June 13, 1978

[54] MATCHING DEVICE FOR FLASH LIGHT PHOTOGRAPHIC DEVICE

[75] Inventors: Tokuichi Tsunekawa; Masanori Uchidoi, both of Yokohama; Zenzo Nakamura, Urawa; Tetsuya Taguchi, Kawasaki; Hiroshi Aizawa, Machida; Takashi Uchiyama, Yokohama, all of Japan

[73] Assignee: Canon Kabushiki Kaisha, Tokyo, Japan

[21] Appl. No.: 748,155

[22] Filed: Dec. 7, 1976

[30] Foreign Application Priority Data

Dec. 12, 1975 Japan ............................. 50-148967
Dec. 12, 1975 Japan ............................. 50-148968

[51] Int. Cl.² ............................................... G03B 15/05
[52] U.S. Cl. ..................................... 354/33; 354/35; 354/139; 354/145; 354/149

[58] Field of Search ................ 354/32, 33, 34, 35, 354/139, 149, 141, 145

[56] References Cited

U.S. PATENT DOCUMENTS

| | | |
|---|---|---|
| 3,631,779 | 1/1972 | Hori et al. ..................... 354/145 X |
| 3,776,112 | 12/1973 | Wilwerding ..................... 354/34 X |
| 3,846,806 | 11/1974 | Yata et al. ..................... 354/34 X |
| 4,005,444 | 1/1977 | Uchiyama et al. ............... 354/35 X |

*Primary Examiner*—L. T. Hix
*Assistant Examiner*—M. L. Gellner
*Attorney, Agent, or Firm*—Toren, McGeady and Stanger

[57] ABSTRACT

An adapter matches an electronic flash unit with a single terminal carrying diaphragm and charge data to a camera having separate terminals for these data. A second adapter matches a flash unit having two terminals for diaphragm and charge data to a camera in which these data pass through a single terminal. Circuitry in the adapters combine or separate the data as needed.

7 Claims, 12 Drawing Figures

MATCHING DEVICE FOR FLASH LIGHT PHOTOGRAPHIC DEVICE

BACKGROUND OF THE INVENTION

1. Field of the Invention

The present invention relates to a matching device, particularly for coupling a camera to a flash light device i.e. a flash unit.

2. Description of the Prior Art

The flash light photographic device as is shown in FIG. 1 has been widely used, whereby the photographic device is so designed that the aperture of the photographic lens is automatically controlled by means of the aperture control device at the side of the camera in accordance with the output signal corresponding to the distance information and the flash light amount information from the flash light device, namely the aperture information, in such a manner that the flash light photography can automatically be carried out.

Further the flash light photographic device as is shown in FIG. 2 has been already proposed, whereby the photographic device is so designed that the aperture of the photographic lens is automatically determined by means of the aperture control device at the side of the camera in accordance with the aperture information from the flash light device corresponding to the aperture to be determined in the camera while the change over circuit automatically changes over the shutter time control circuit for the daylight photography to the time constant circuit for the flash light photography in accordance with the flash light operation ready signal (hereinafter referred to this signal as the charge completion signal) produced by the flash light device at the time of the charge completion, whereby the shutter time for the flash light photography is controled in accordance with the output of the thus selected time constant circuit for the flash light photography in such a manner that the flash light photography can be carried out.

Below the above mentioned conventional devices will be explained in accordance with FIGS. 1 to 3 for the sake of the easy comprehension of the present invention.

FIG. 1 shows the former flash light photographic device, whereby SA is the flash light device body, CA the camera body and CL the photographic lens to be mounted on the camera body CA. As is shown in FIG. 3, the camera body CA includes the photoelectric element 301 for sensing the light coming from the object so as to produce an electrical signal corresponding to the incident light amount, the main switch 304, the battery 303, the synchronization switch 305 for the flash light device to be closed when the shutter is totally opened and the ampere member 302 into which various informations such as the sensitivity information $S_v$, the shutter time information $T_v$, the smallest F value $A_{Vo}$ of the photographic lens to be used and the vignetting value information $A_{vc}$ are introduced so as to indicate the aperture value to be set. Further the flash light pohotographic device includes the attachment ring FAR functionally engaged with the not shown distance ring on the photographic lens CL so as to produce the distance information $D_v$ and the afore mentioned informations $A_{vo}$, $A_{vc}$ and $T_v$, the terminals $a5$, $b5$, $a6$, $b6$ for transmitting the information $(D_v + A_{vo} + A_{vc} - T_v)$ produced by the attachment ring FAR to the flash light device, the current supply terminals $a4$, $b4$ for supplying the current from the camera body CA so as to actuate the electrical circuits in the flash light device, the earth terminals $a3$, $b3$, the signal terminals $a2$, $b2$ and the synchronization signal terminals $a1$, $b1$.

The daylight photography by means of the device shown in FIG. 1 is carried out as follows. Through the rotation of the ampere meter 302, the film sensitivity information $S_v$, the shutter time information $T_v$, the smallest F value and the vignetting value information are introduced in the camera, while the finger of the ampere meter 302 indicate the aperture value corresponding to those informations when the photoelectric element 301 produces an electrical signal corresponding to the brightness of the object. When the ampere meter 302 indicate the aperture value to be determined, the aperture is determined in accordance with this indication, while the proper exposure amount is controlled by opening the shutter for a period corresponding to the shutter time so as to terminate the daylight photography. The flash light photography can be carried out by combining the flash light device and the attachment ring FAR with the camera. Namely in this case, the afore mentioned information $(D_v + A_{vo} + A_{vc} - T_v)$ given from the attachment ring FAR is given to the flash light device body SA through the terminals $a5$, $b5$, $a6$ and $b6$, when in the device body SA the information from the attachment ring FAR is operated with the flash light amount information $P_v$ corresponding to the flash light amount of the flash light device in such a manner that the information corresponding to the result $(P_v - (D_v + A_{vo} + A_{vc} - T_v))$ of the operation made in the flash light device is given to the camera body CA through the signal terminals $a2$, $b2$ when the charge of the flash light device has been completed. When this signal is given to the camera, the ampere meter 302 indicates the aperture value corresponding to the signal and various signals such as film sensitivity information $S_v$, the shutter time information $T_v$ set in the camera and $A_{vo}$ and $V_{vc}$ from the photographic lens CL.

When the ampere meter 302 indicates the aperture value to be determined, the aperture is determined in accordance with this indication, while when the shutter is totally opened, the flash light trigger signal is given to the flash light device through the synchronization signal terminals $b1$ and $a1$ so as to actuate the flash light device in such a manner that the proper exposure amount is controlled so as to terminate the flash light photography by closing the shutter after the lapse of a certain determined time.

FIG. 2 shows the latter flash light device so designed that the selected aperture is transmitted to the camera from the flash light device so as to automatically set the aperture while the flash light amount of the flash light device is controlled by the light reflected by the object, whereby the camera CB in this flash light device is so designed that by means of the charge completion signal $Y8$ from the flash light device SB the daylight photographic mode is changed over into the flash light photographic mode while the absolute aperture value signal $(A_v)$ from the flash light device is supplied through the terminal $a9$. Further the photographic lens CL delivers the information of the smallest F value $(A_{vo})$ to the camera CB. Then the absolute aperture value $(A_v)$ from the flash light device SB is operated with the smallest F value signal $(A_{vo})$ of the lens in the camera body in such a manner that the aperture of the photographic lens is controlled in accordance with the information of the operation result ($\Delta A_v = A_v - A_{vo}$). Hereby $Y7$ is the synchronization information, Y10 the earth information, the input information (LS) to the flash light device the level set in information and Sv the film sensitivity information.

The aperture in the camera CB is automatically set at the selected at the aperture value in accordance with the selected aperture signal from the flash light device after the informations have been operated, while the flash light amount of the flash light device is automatically controlled by means of the light reflected from the object in such a manner that the proper exposure can be obtained.

As mentioned above, the composition of the former flash light photographic device is different from the latter flash light photographic device, so that there has been no interchangeability between them. Namely it has been impossible to use them in combination with each other by means of mounting the flash light device of the former flash light photographic device on the camera of the latter flash light photographic device, because one aperture information terminal $a2$ is provided on the flash light device of the former flash light photographic device while not only the aperture information terminal $a9$ but also the charge completion terminal $a8$ are provided on the camera of the latter flash light photographic device. Further the combination of the both devices has been impossible not only from the constructional reason but also from the functional reason.

Namely the flash light device constituting the former flash light photographic device delivers the aperture information signal corresponding to the smallest F value, the vignetting value of the photographic lens, the shutter time information, the flash light amount information and the distance information, while the signal needed for the aperture control device of the camera constituting the latter flash light photographic device is the one corresponding the absolute aperture value signal, so that the correct aperture can not be obtained when the signal corresponding to the flash light amount information, the distance information and so on as mentioned above is delivered from the flash light device constituting the former flash light photographic device to the camera constituting the latter flash light photographic device, whereby it is impossible to use them in combination with each other.

Further it has been also impossible to carry out the flash light photography in the same way as mentioned above by mounting the flash light device of the latter flash light photographic device on the camera of the former flash light photographic device in the way contrary to the above. Namely on the camera of the former flash light photographic device one aperture signal terminal $b2$ is provided while on the flash light device of the latter flash light photographic device not only the aperture signal terminal $a9$ but also the charge completion signal terminal $a8$ are provided so that it has been impossible to use them in combination with each other from the constructional reason.

Further the combination of the both devices has been impossible not only from the constructional reason but also from the functional reason.

Namely, the signal delivered from the output terminal of the flash light device of the latter flash light photographic device is the one corresponding to the absolute aperture value information as mentioned above, while the signal needed for the camera of the former flash light device is the one in which the flash light amount information, the distance information, the smallest F value, the vignetting value information of the photographic lens and the shutter time are taken into consideration but the film sensitivity information is not taken into consideration so that the correct aperture can not be obtained when such a signal corresponding to the absolute apertue value as mentioned above is delivered from the flash light device of the latter flash light photographic device to the camera of the former flash light photographic device, whereby it has been impossible to use the both devices in combination with each other.

Further, when the flash light photography is carried out with the camera suited to the former flash light photographic device, the proper exposure can be obtained by means of the information delivered from the flash light device to the camera when the shutter time is set at a certain determined time such as 1/60 suited for the flash light photography, while when the flash light photography is carried out with the camera suited to the latter flash light device, the shutter time is automatically set at a time suited to the flash light photography, whereby it is not necessary to operate the shutter dial because the shutter time information input to the aperture control means of the camera is fixed. However, when the latter flash light device is connected to the camera suited to the former flash light device through the information matching device, it is necessary to set the shutter time the camera at 1/60 sec. suited to the flash light photography in advance.

SUMMARY OF THE INVENTION

A purpose of the present invention is to offer a matching device for giving the interchangeability to the above mentioned flash light photographic devices.

Another purpose of the present invention is to offer a matching device for matching the camera of the latter flash light photographic device with the flash light device of the former flash light photographic device.

Further another purpose of the present invention is to offer a matching device for matching the flash light device of the latter flash light photographic device with the camera of the former flash light photographic device.

Further other purposes will be disclosed out of the explanation to be made below in detail in accordance with the accompanying drawings.

PREFERRED EMBODIMENTS OF THE INVENTION:

Below at first the matching devices for matching the camera CB for the latter flash light photographic device with the flash light device SA for the former flash light photographic device will be explained before explaining the embodiments in accordance with the present invention.

Figure 4:
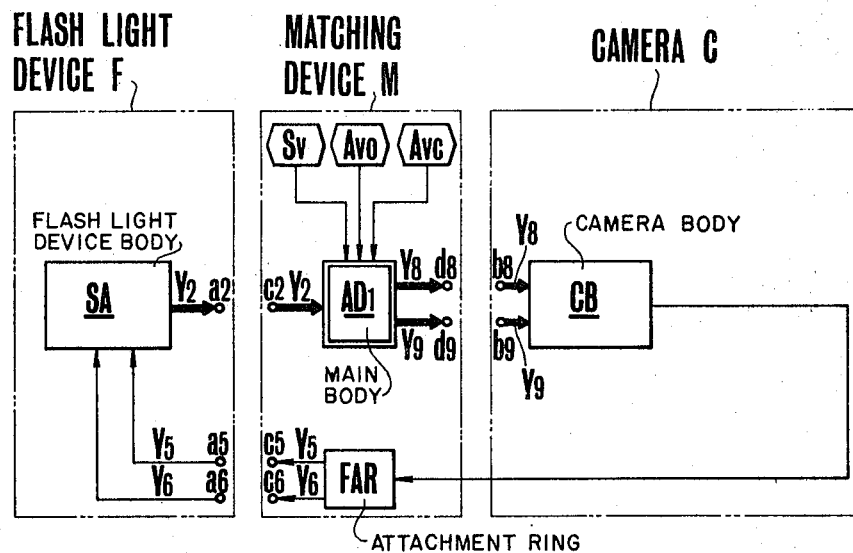
FIG. 4 shows an explanatory drawing of the flash light photographic device in accordance with the present invention.

FIG. 4 shows a block circuit diagram for explaining the principle of the matching device in accordance with the present invention, whereby the part in the dotted line F is a flash light device constituting the former flash light photographic device out of the afore mentioned flash light photographic device. This flash light device F includes a flash light device body SA as well as the terminals $a2$, $a5$ and $a6$ provided on the flash light device body SA, which includes a not shown discharge tube, a not shown capacitor for storing the flash light energy, a not shown operational circuit for operating the information corresponding to the terminal voltage of the capacitor, namely the flash light information with the distance information introduced through the terminals $a5$ and $a6$ so as to produce a signal corresponding to those informations and so on, whereby the above mentioned terminal $a2$ is connected to the output terminal of the operational circuit so as to deliver from the flash light device the output signal of the afore mentioned operational circuit. The part in the dotted line C is the camera constituting the latter flash light photographic device out of the afore mentioned flash light photographic devices, including the camera body CB, the terminals $b8$ and $b9$ provided on the camera body CB, the not shown photographic lens and so on, whereby the above mentioned camera body CB includes the not shown aperture control device connected to the terminal $b9$ so as to control the aperture of the photographic lens in accordance with the aperture information introduced through the terminal $b9$, the not shown time constant circuit for the flash light photography, the not shown shutter time control circuit for controlling the opening and the closing time of the not shown shutter, the not shown change over circuit for selectively connecting either of the afore mentioned time constant circuits to the input terminal of the afore mentioned shutter time control circuit and so on, while the input terminal of the change over circuit provided in the afore mentioned camera body CB is connected to the terminal $b8$. The part in the dotted time M is the matching device, which includes the terminal $c2$ provided on the main body AD1, so as to be connected to the terminal $a2$ provided on the flash light device SA, the terminal $d8$ provided on the main body AD1 so as to be connected to the terminal $b8$ provided on the camera body CB, the terminal $d9$ provided on the main body AD1 so as to be converted to the terminal $b9$ provided on the camera body CB and the attachment ring FAR which can be mounted on the photographic lens attached to the camera body CB in such a manner that the attachment ring FAR is functionally engaged with the distance ring of the photographic lens so as to deliver from the terminals $c5$ and $c6$ the distance signal corresponding to the distance up to the object set by means of the not shown distance ring, whereby the main body AD1 includes the operational circuit for converting the signals corresponding to the distance information as well as the flash light amount information reaching the terminal $c2$ of the matching device M from the terminal $a2$ of the flash light device F, the smallest F-value of the photographic lens, the vignetting value and the shutter time information into the signal corresponding to the absolute aperture value information, while the afore mentioned terminals $d8$ and $d9$ are connected to the output terminal of the not shown operational circuit. Hereby the terminal $d9$ delivers the aperture signal corresponding to the output signal of the operational circuit, while the terminal $d8$ delivers the signal only when the operational circuit delivers the signal, namely when the capacitor of the flash light device F has been charged.

Below the operation of the devices constituted as above will be explained. The flash light device F, the matching device M and the camera C are positioned as shown in FIG. 4 so as to be engaged with each other. In this way, the terminal $a2$ is connected to the terminal $c2$, the terminal $a5$ to the terminal $c5$, the terminal $a6$ to the terminal $c6$, the terminal $d8$ to the terminal $b8$ and the terminal $d9$ to the terminal $b9$.

When then the distance ring provided on the photographic lens of the camera is rotated so as to achieve focusing before taking a picture, in functional engagement with the focusing the attachment ring FAR delivers the information $(Dv + Avo + Avc - Tv)$ consisting of the distance information signal $Dv$ and the afore mentioned informations $Avo$, $Avc$ and $Tv$ from the terminals $c5$ and $c6$, while the flash light device F delivers from the terminal $a2$ the signal $(Pv - (Dv + Avo + Avc - Tv)$ corresponding to the flash light amount information, the distance information and so on when the capacitor in the flash light device F has been charged. When this signal is applied to the matching device M by means of the terminal $c2$, the not shown switching circuit connected to the terminal $c2$ is brought into the conductive state, whereby the level of the output voltage of the terminal $d8$ connected to the output terminal of this not shown switching circuit becomes high in such a manner that the charge completion signal is applied to the change over circuit in the camera C through the terminal $b8$ at the side of the camera C so as to actuate the change over circuit and thus automatically connect the time constant circuit for the flash light photography to the shutter time control circuit. When on the other hand the afore mentioned signal is applied to the terminal $c2$ from the terminal $a2$, the film sensitivity information, the shutter time information and the vignetting compensation information of the photographic lens to be used are added to this signal by means of the operational circuit, in such a manner that the output signal of the operational circuit is applied to the terminal $b9$ at the side of the camera from the terminal $d9$ of the matching device M. When then the not shown release button is pushed down, the aperture control device in the camera C controls the aperture of the photographic lens in accordance with the aperture information applied to the terminal $b9$, while when the release button is further pushed down the shutter time control circuit controls the opening time of the not shown shutter in accordance with the output signal of the time constant circuit for the flash light photography connected to the input terminal of the shutter time control circuit.

Below an embodiment of the afore mentioned matching device M will be explained in accordance with FIGS. 5 to 8 in a concrete way.

Figure 5:
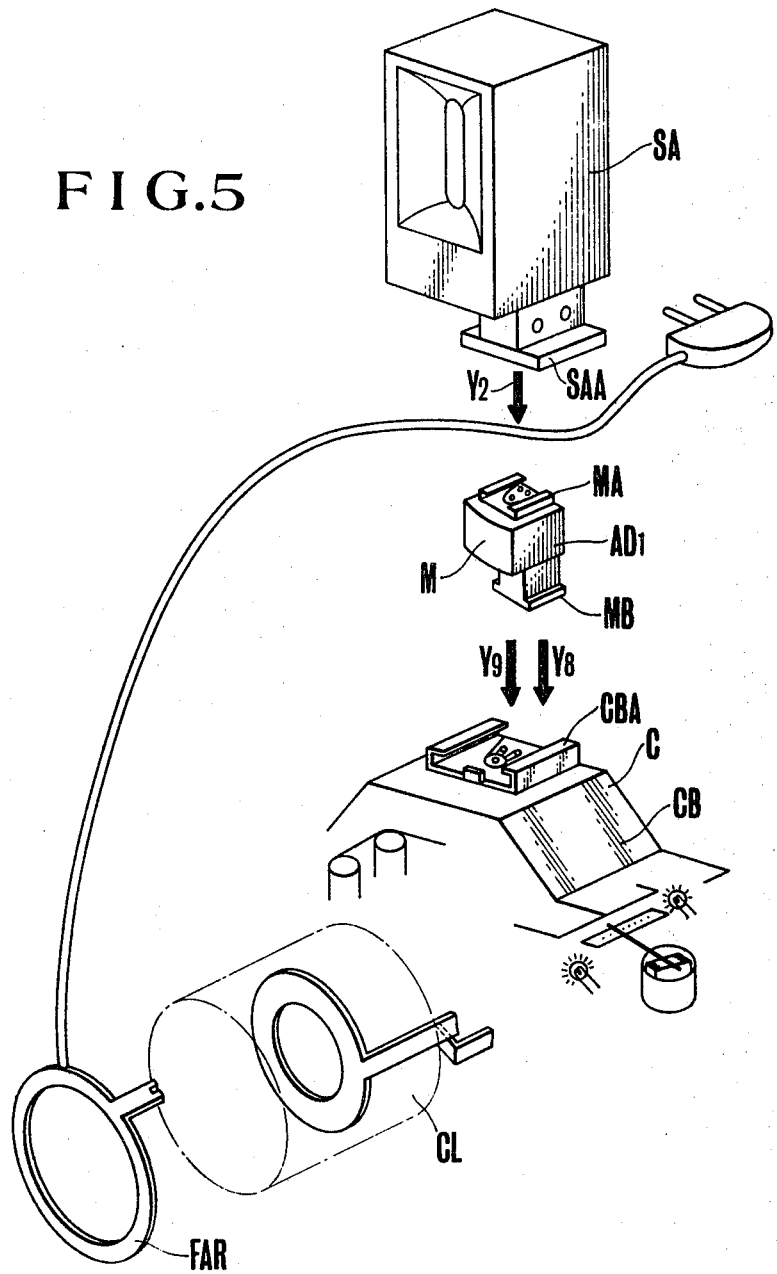
FIG. 5 shows a flash light photographic device to which the matching device in accordance with the present invention is applied in perspective view.
Figure 6:
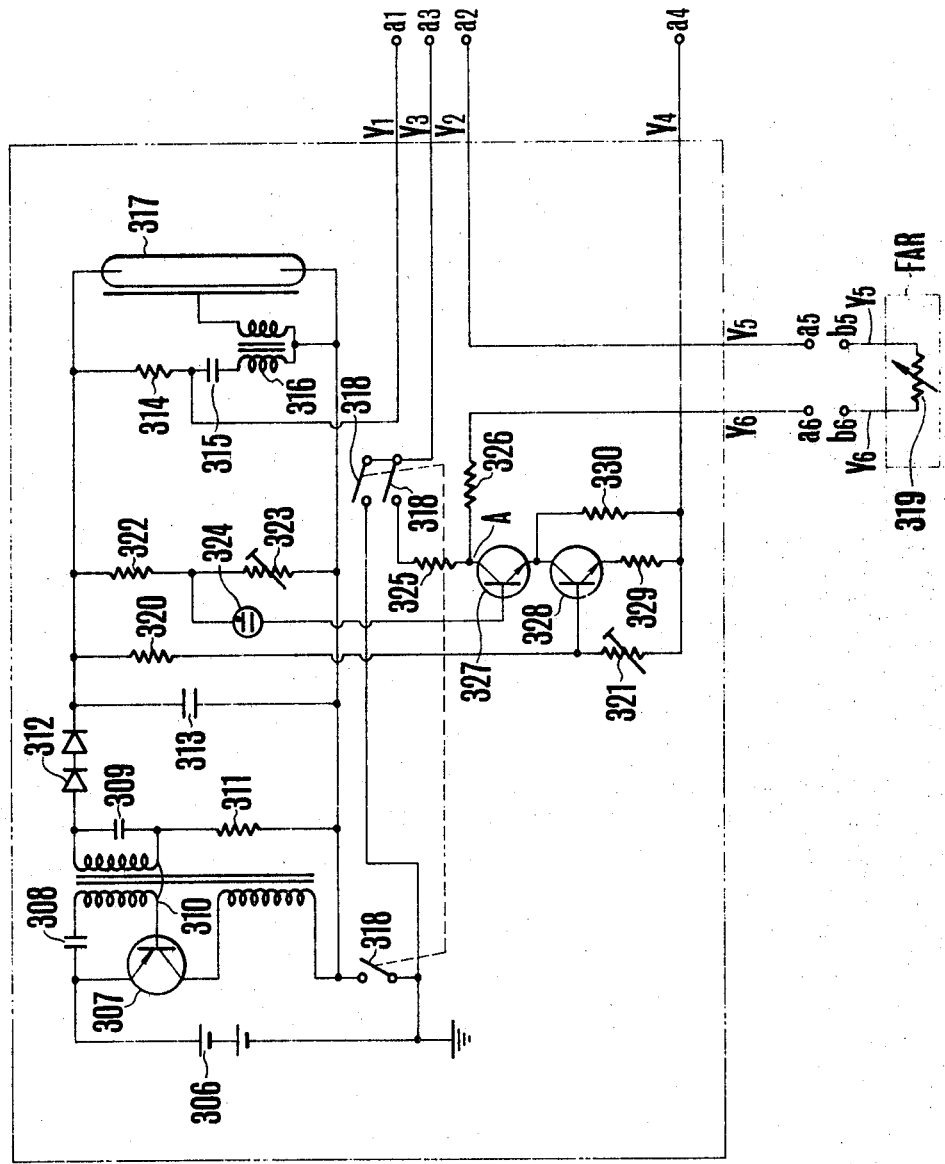
FIG. 6 shows a circuit diagram of the flash light photographic device shown in FIG. 1.

FIG. 5 shows the flash light device SA, the matching device M, the camera C and the attachment ring FAR in perspective view, whereby these devices are shown separated from each other for the sake of easy understanding. In FIG. 5, the terminals a2, a5 and a6 shown in FIG. 4 and so on are provided of the foot SAA at the lower part of the flash device SA, while the terminal c2 shown in FIG. 4 and so on are provided in the socket MA at the upper part of the matching device M, and further the terminals d8, d9 and so on are provided on the foot MB at the lower part of the matching device M, whereby the foot SAA of the flash light device SA can be mounted in the socket MA of the matching device M. Further on the hot shot CBA provided at the upper part of the camera C the terminals b8 and b9 shown in FIG. 4 are provided, whereby the foot MB of the afore mentioned matching device M can be adapted in this hot shoe CBA. Below the concrete circuit of the flash light device SA will be explained in accordance with FIG. 6. In FIG. 6, 306 is the battery whose negative electrode is earthed while 307 – 311 constitute the oscillation circuit, whereby 307 is PnP transistor whose emitter electrode is connected to the positive electrode of the battery 306 and whose collecter electrode is earthed through the primary coil of the transformer 310 and the switch 318, 308 a capacitor whose one terminal is connected to the emitter electrode of the transistor and whose other terminal is connected to the base electrode of the transistor 307 through the primary coil of the transformer 310, 309 the capacitor, 311 the resistance connected to the one terminal of the capacitor 309, 312 the rectifying diode connected to the secondary coil of the transformer 310 and 313 the main capacitor connected to the output terminal of the diode 312 whereby the flash light energy is stored in the capacitor 313. 314 – 316 constitute the trigger circuit, whereby 314 is the resistance, 315 the capacitor connected to the resistance 314 and 316 the transformer connected to the capacitor 315, whereby the secondary coil of the transformer 316 is connected to the trigger electrode of the discharge tube 317. 319 is the resistance provided in the attachment ring FAR so as to be functionally engaged with the distance ring on the camera and assume a value correspondng to (D$v$ + A$vo$ + A$vc$ − T$v$). Hereby D$v$ is the distance between the camera and the object, A$vo$ the smallest F value of the photographic lens to be used, T$v$ the shutter time value and A$vc$ the vignetting information value of the photographic lens to be used. 320 is the resistance connected to the output terminal of the diode 312, 321 the resistance connected to the resistance 320 and 322 and 325 the resistances connected in series to each other, whereby the series circuit consisting of these resistances 322 and 323 is connected parallel to the main capacitor 313. 324 is the voltage detecting neon tube connected to the series circuit, 325 the resistance connected to the collecter electrode of the transistor 327, A the output terminal of the voltage dividing circuit consisting of the resistance 325, the transistors 327 and 328 are the resistance 329, 326 the resistance and 327 the nPn transistor, whereby the base electrode of this transistor 327 is connected to the output terminal of the neon tube 324 while the emitter electrode is connected to the collecter electrode of the transistor 328. 328 is the nPn transistor for detecting the charge voltage of the main capacitor 313, whereby the base electrode of this transistor 328 is connected to the bias setting resistance 321 while the emitter electrode is connected to the terminal a4 through the resistance 329. a1 is the synchronization signal terminal connected to the capacitor 315 in the trigger circuit while a2 is the signal terminal explained in accordance with FIG. 4 and connected to the resistance 319 in the attachment ring FAR through the terminals a5 and b5. a3 is the terminal earthed through the tripple switch 318 and a5 and a6 the terminals constituting the distance signal input terminal whereby a6 is the terminal connected to the collector electrode of the switching transistor 327 through the resistance 326.

Figure 7:
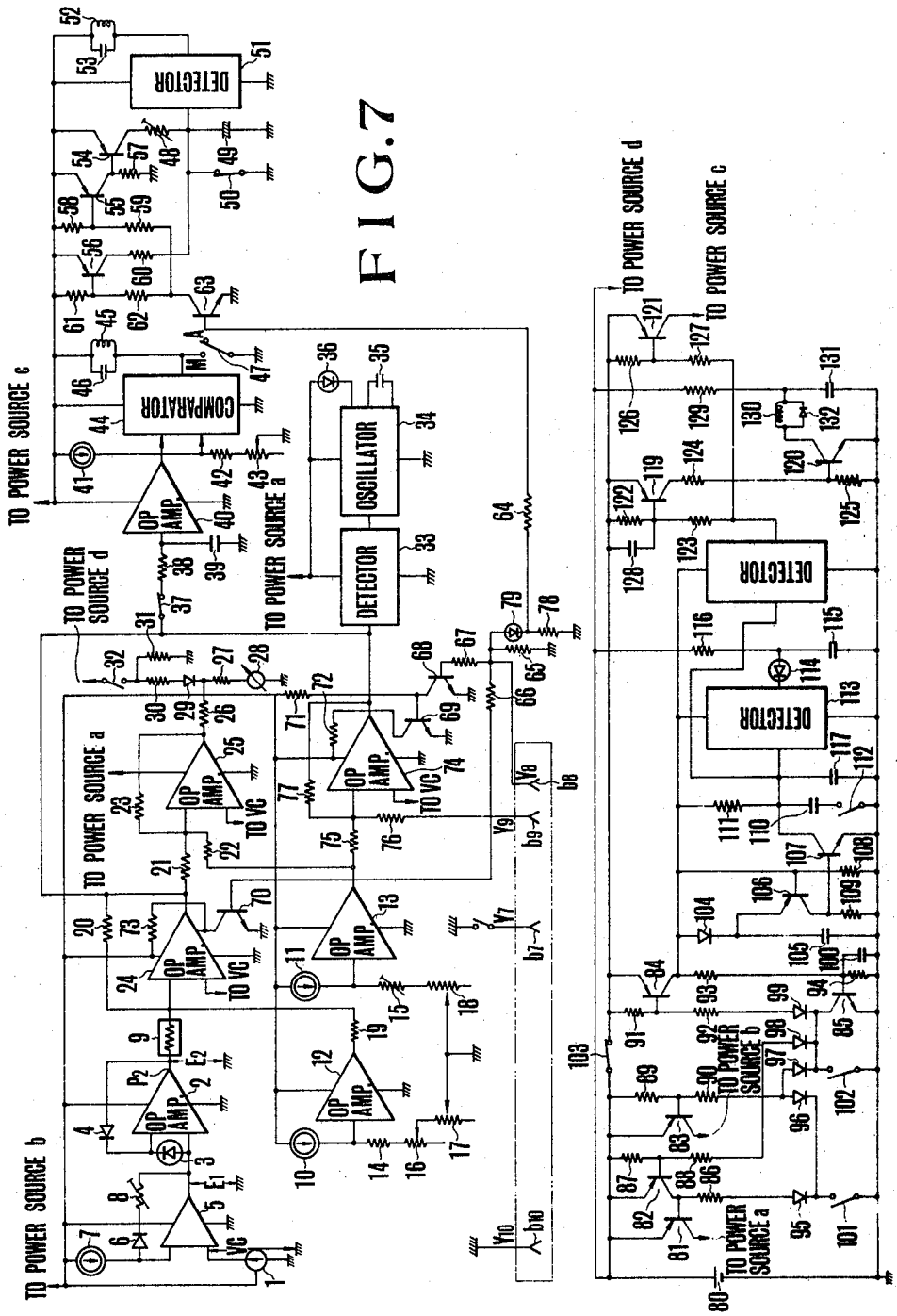
FIG. 7 shows a circuit diagram of the camera shown in FIG. 2.

Below the electrical circuit provided in the main body CB in the camera C will be explained in accordance with FIG. 7. In FIG. 7, 1 is the level setting constant voltage source whose input terminal is connected to the collecter electrode of the transistor 81 forming a power source b and whose output terminal is connected to the one input terminal of the operational amplifier 5, 2 the light measuring operational amplifier, 3 the light sensitive element such as silicone photocell, phototransistor and the like for sensing the light beam from the object, 4 the diode connected between the input terminal and the output terminal of the operational amplifyer 2 so as to compress the photoelectric current of the logarithmic way, 6 the temperature compensating diode and 7 the constant current source consisting of the transistors and so on, so as to deliver to the temperature compensating diode 6 the bias current equal to the photoelectric current of the light measuring circuit H consisting of the elements 2 –4 at the standard brightness. Further 9 is the temperature compensating resistance consisting of cupper wire or the like presenting a positive temperature coefficient. Below the output voltage of the voltage source 1 is called V$c$, the output voltage of the operational amplifier 5 E1 and the output voltage of the operational amplifier 2 E2. 14 and 15 are the voltage adjusting resistance, 16 the variable resistance for setting the difference (S$v$ − T$v$) between the film sensitivity (S$v$) and the shutter time (T$v$), 17 the variable resistance for setting the vignetting compensation information (A$vc$), 18 the variable resistance for setting the smallest F value (A$vo$) of the photographic lens, 19 – 23 the resistance for operating informations, 24 and 25 the operational amplifiers for operating informations and 26 – 28 the display circuit for displaying the exposure value, whereby 26 and 27 are the resistances while 28 is the display meter. 29 – 31 constitute the power source voltage checking circuit, whereby 29 is the diode for electrically separating the afore mentioned display circuit from the power source checking circuit while 30 is the level setting resistance for the power source voltage checking and 31 the current setting resistance for allowing the passage of the same current as in the exposure control circuit to be explained later at the time of the power source checking. 32 is the power source voltage checking switch while 33 – 36 constitute the low brightness alarm circuit, whereby 33 is the detecter whose input terminal is connected to the output terminal of the operational amplifiers 24 and 74, 34 the oscillater, 35 the condenser and 36 the illuminating diode for the low brightness alarm. Hereby the detecter 35 is supplied with the information of the aperture in step number as has already been mentioned. When the aperture information from the operational amplifyer 24 is smaller than the smallest F value of the photographic lens, the oscillater 34 starts to oscillate by means of the output signal from the output terminal of the detecter, whereby the illuminating diode 36 winkles so as to display that the brightness of the object is too low. 37 is the memory switch to be opened in functional engagement of the lifting of the not shown mirror, while 38 is the resistance. 39 – 46 constitute the aperture control device, whereby 39 is the capacitor for memorizing the object brightness information, 40 the operational amplifyer with high input impedance, 41 the constant current source, 42 the adjusting resistance and 43 the variable resistance for setting the aperture information, whereby the value of the resistance 43 is varied in functional engagement with the governer which is charged in functional engagement with the film winding up lever and starts to rotate in functional engagement with the operation of the shutter release button. 44 is the comparater for comparing the aperture information memorized in the capacitor 39 with the aperture information of the resistance while 45 is the magnet for driving the not shown aperture control mechanism, being demagnetized by means of the signal from the afore mentioned comparater, 46 is the capacitor constituting a resonance circuit with the magnet 45 so as to compensate the residual magnetism of the magnet 45 and improve the efficiency of the magnet 45. 47 is the operation mode change over switch to be connected to the (A) side in case of the automatic aperture setting mode and to the (M) side in case of the manual aperture setting mode. 48 and 49 constitute the time constant circuit for the daylight photography whereby 48 is the shutter time setting variable resistance for the daylight photography while 49 is the time constant capacitor. 50 is the count switch in functional engagement with the not shown front shutter plane, while 51 – 53 constitute the shutter time control circuit whereby 51 is the detecter consisting of the Schmitt-circuit, 52 the magnet for controling the rear shutter plane and 53 the capacitor connected parallel to the magnet 52. 54 – 64 constitute the automatic shutter time change over circuit for automatically changing over the shutter time into a certain determined time, such as 1/60 sec. by means of the charge completion signal from the flash light device in case the flash light device SA is used, whereby 54 – 56 are the transistors, 57 – 62 the resistances and 60 the resistance for constituting the time constant circuit for the flash light photography. 63 is the transistor while 64 is the resistance. 65 – 73 constitute the circuit for switching on the afore mentioned information operation processing circuit for automatically setting the aperture value of the camera by making use of the aperture information from the matching device M by means of the charge completion signal from the flash light device SA when the flash light device SA is mounted, whereby 65 – 67 are the resistances, 68 – 70 the transistors and 71 – 73 the resistances. By means of the charge completion signal from the flash light device SA the transistors 55, 56, 63, 68 and 70 are brought into the switched on state while the transistors 54 and 69 are brought into the switched off state in such a manner that the capacitor 49 is charged through the transistor 56 and the resistance 60 on which a certain determined shutter time for the flash light photography is set. 78 and 79 constitute the display circuit for displaying the charge completion state of the flash light device SA, whereby 78 is the resistance while 79 is the illuminating diode for displaying the charge completion state.

Figure 8:
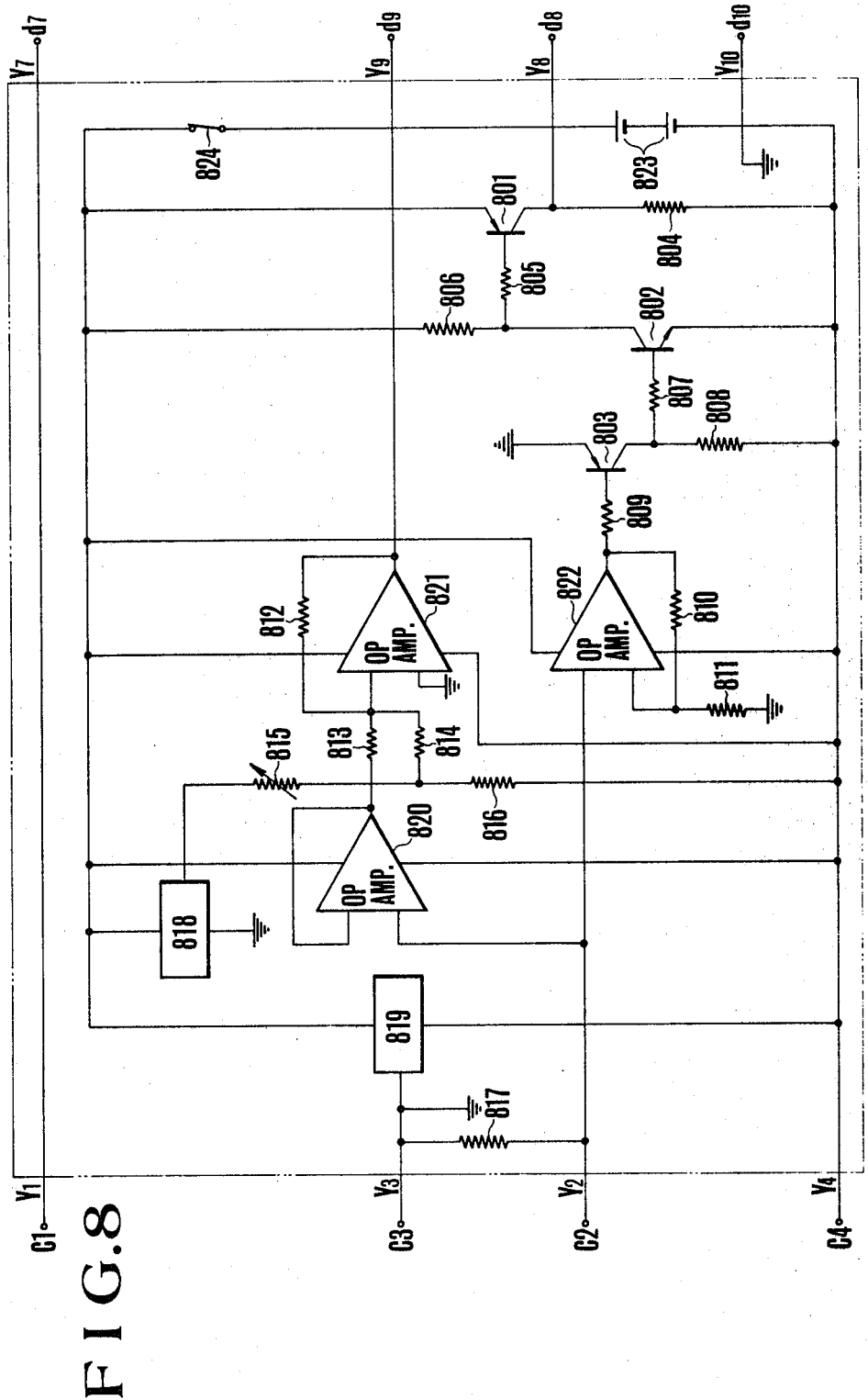
FIG. 8 shows a circuit diagram of the matching device shown in FIG. 2.

80 – 103 constitute the power source driving circuit, whereby 80 is the battery, 81 – 85 the transistors, 86 – 94 the resistances, 95 – 99 the diodes, 100 the noise preventive capacitor and 101 the switch to be closed by means of the first stroke of the not shown shutter release button in the camera. When the switch 101 is closed, the transistors 81 and 83 are brought into the switched on state in such a manner that the current is supplied from the power sources a and b so as to actuate the light measuring circuit and the exposure display circuit. By means of the second stroke of the shutter release button the switch 102 is closed, whereby the current supply to the exposure display circuit from the power source a is interrupted at the same time while the power source self holding circuit consisting of the transistors 84, 85 and the resistances 91 – 94 is actuated so as to self hold the current supply from the power source b. After the above mentioned state has once be established, the current supply from the power source b is maintained by means of the self holding circuit even if the shutter release button of the camera is let free so as to open the switches 101 and 102. 103 is the safety switch to be opened in functional engagement with the start of the rear shutter plane and to be closed in functional engagement with the film winding up. 104 – 109 constitute the automatic reset circuit of the self-timer and the delay circuit for delaying until the first holding operation. 104 is the diode, 105 the capacitor, 106 and 107 the transistors and 108 and 109 the resistances. 110 – 116 constitute the afore mentioned self-timer circuit, whereby 110 is the shutter time delay capacitor, 111 the shutter time resistance, 112 the switch for the self-timer and 113 the detector for delivering a signal at a certain determined time before the operation of the shutter of the camera so as to actuate the advance display device 114 for the self-timer and give the photographic advance information to the photographer. 115 is the charge storing capacitor for actuating the self-timer operation display device 114 without fail, while 116 is the resistance. 117 and 118 constitute the first holding delay circuit, whereby 117 is the capacitor, while 118 is the detector for delivering a signal at a certain determined delay time in case of the normal daylight photography. 119 – 132 constitute the first holding and the current supply circuit. Hereby 119 – 121 are the transistors, 122 – 127 the resistances, 128 the noise preventive capacitor and 129 the resistance for controling the charging speed of the capacitor 131 serving as the power source for the magnet 130. The value of this resistance is chosen in such a manner that the charging speed sufficient enough to charge the capacitor 131 fully can be obtained in case the camera is used with short time interval. 132 is the counter-pulse preventive diode for the magnet 130. Hereby, when a signal is delivered from the detector 118, the transistors 119 – 121 are brought in the switched on state so as to actuate the first holding, while at the same time a current is supplied from the power source terminal C so as to actuate the automatic aperture control circuit and the afore mentioned shutter time control circuit. In this way the automatic exposure control is carried out with the value in accordance with the light measurement and the information operation. b10 is an earthed terminal, b7 is the synchronization signal terminal connected to the synchronization switch in functional engagement with the front shutter plane, so as to be closed when the shutter is totally opened, b8 the charge completion signal terminal connected to the connecting point of the resistances 65, 66 and 67 and b9 the aperture information signal terminal connected to the resistance 76. Below the matching device M will be in a concrete way. FIG. 8 shows the circuit diagram of the matching device M explained in accordance with FIG. 1, whereby 801 and 803 are the PnP transistors, 802 the npn transistor, 804 the resistance connected to the collecter electrode of the transistor 801, 805 the resistance connected to the base electrode of the transistor 801, 806 the resistance connected to the collecter electrode of the transistor 802 and the resistance 805, 807 the resistance connected to the base electrode of the transistor 802, 808 the resistance connected to the resistance 807, 809 the resistance connected to the base electrode of the transistor 803, 810 the resistance connected between the input terminal and the output terminal of the operational amplifier 822, 811 the resistance whose one terminal is connected to the one input terminal of the operational amplifier 822 and whose other terminal is earthed, 820 and 821 the operational amplifiers, 812 the resistance connected between the input terminal and the output terminal of the operational amplifier 821, 813 the resistance connected to the output terminal of the operational amplifier 820 and to the one input terminal of the operational amplifier 821, 814 the resistance connected to the one input terminal of the operational amplifier 821, 815 and 816 the resistances constituting a voltage dividing circuit, 817 the resistance, 818 and 819 the constant voltage sources and c3 the terminal to be connected to the terminal a3 on the flash light device F, whereby the terminal c3 is earthed. c2 is the terminal connected to the input terminal of the operational amplifiers 820 and 822 and to be connected to the terminal a2 on the flash light device F while c4 is the terminal connected to the negative electrode of the battery 823 and to be connected to the terminal a4 on the flash light device F, whereby the electrical potential at the terminal c4 is so chosen as to be lower than the electrical potential at the terminal c3 by 1.3 volt because the one terminal of c4 is connected to the negative electrode of the battery 823 while the terminal c3 is earthed. c1 is the terminal to be connected to the terminal a1 on the flash light device F, $d7$ the synchronization signal terminal connected to the terminal c1 and to be connected to the terminal b7 on the camera C and d9 the aperture signal terminal to be connected to the terminal b9 on the camera whereby the one terminal of d9 is connected to the output terminal of the operational amplifier 821. d8 is the charge completion signal connected to the collecter electrode of the transistor, whereby the one terminal of d8 is to be connected to the terminal b8 on the camera C. d10 is the earthed terminal whose one terminal is earthed and whose other terminal is to be connected to the terminal b10 on the camera.

Below the operation of the flash light device composed as explained above will be explained. When the flash light device F, the matching device M and the camera C are connected to each other, the terminals on these devices are connected to the corresponding terminals. When then the distance ring provided on the photographic lens is rotated so as to set the distance between the camera and the object, the attachment ring FAR is also rotated in functional engagement with the distance ring in such a manner that the resistance 319 in the attachment ring FAR assumes the value $(Dv + Avo + Avc - Tv)$. On the other hand, when the terminal voltage of the capacitor 313 reaches the flash light operation ready voltage in a certain determined time after the switch 318 in the flash light device F shown in FIG. 6 has been closed, the neon tube 324 and the switching transistor 327 are brought into the conductive state. Further the flash light amount information $Pv$ of the main condenser is delivered to the transistor 328. In consequence the signal corresponding to $[Pv - (Dv + Avo + Avc - Tv)]$ is produced between the earthed terminal a3 and the signal terminal a2 when the flash light device F is ready for operation. When this signal is delivered to the operational amplifier 821 constituting an operational circuit in the matching device M through the terminals c2 and c3 and the buffer amplifier 820 in the matching device M, the operational amplifier 821 operates the signal $[Pv - (Dv + Avo + Avc - Tv)]$ from the flash light device F with the signal $(Sv - Tv + Avo + Avc)$ set at the resistance in such a manner that a voltage corresponding to $[Pv - (Dv + Avo + Avc - Tv)] + (Sv - Tv + Avo + Avc) (= Pv + Sv - Dv)$ is produced between the aperture information signal terminal d9 connected to the output terminal of the operational amplifyer 821 and the earthed terminal d10. On the other hand, when a negative voltage corresponding to $[Pv - (Dv + Avo + Avc - Tv)]$ is delivered to the input terminal of the operational amplifier 822 constituting the charge completion signal producing circuit from the flash light device F through the terminal c2, the transistors 803, 802 and 801 are brought into the conductive state so that the charge completion signal terminal d8 is connected to the battery 823 through the transistor 801, and the switch 824 so as to produce a positive voltage at the terminal d8. When the camera C is directed toward the object and the not shown shutter release button is pushed down, the switch 101 in the camera C is closed, whereby the base current runs through the base of the transistors 81 and 83 through the resistance 86, the diode 95 respectively through the resistance 90 and the diode 96 so as to bring the transistors 81 and 83 in such a manner that the driving voltage is produced between $a$ and $b$ (FIG. 7) so as to bring all the circuit in the operable state. At this time, a positive voltage is applied to the base of the transistor and to the base of the transistor 70 from the battery 823 (FIG. 8) through the terminal b8 so as to bring the transistors 68 and 70 in the conductive state and the transistor 69 in the non conductive state in such a manner that the operational amplifier 24 is brought into the non-operable state while the operational amplifier 74 is brought into the operable state. In consequence, the operational amplifier 74 operates the aperture signal $(Pv + Sv - Dv)$ from the terminal b9 with the smallest F value signal $(Avo)$ from the operational amplifier 13 so as to produce at the output terminal a signal $[(Pv + Sv - Dv) - Avo]$, namely the signal $(\Delta Av)$ corresponding to the step number up to which the aperture of the photographic lens should be closed, whereby the voltage corresponding to this signal $(\Delta Av)$ is memorized in the capacitor 39 through the switch 37 and the resistance 38 shown in FIG. 7. Hereby the signal $(\Delta Av)$ produced by the operational amplifier 74 is also delivered to the input terminal of the operational amplifier 25 so that the operational amplifier 25 so that the operational amplifier 25 operates the output signal $[(Pv + Sv - Dv) - Avo]$ of the operational amplifier 74 with the output signal $Avo$ of the operational amplifier 13 so as to produce the signal $|Av| = [(Pv + Sv - Dv) - Avo] + (Avo) = (Pv - Sv - Dv)$. Thus a current runs through the meter 28 serving as the display device via the resistances 26 and 27 so that the meter 28 display the aperture information. When the shutter release button is further pushed down, the switch 102 shown in FIG. 7 is closed, whereby the base current runs through the base of the transistor 82 so as to bring the transistor 82 into the conductive state. Thus the transistor 81 is inversed into the non-conductive state and no voltage is applied to the collecter of the transistor 81 from the battery 80 any more so that the operational amplifier 25 is brought into the non-operable state whereby the display meter 28 does not display the aperture information any more. At the same time the afore mentioned power supply self-holding circuit is actuated, the transistor 83 continues to supply the driving voltage to the circuit. Then after the lapse of a certain time determined by the value of the resistance 111 and the capacity of the capacitor 117, the high level of the output of the detector 118 consisting for example of the Schmitt-circuit is inverted into the low level so as to bring the transistor 121 into the conductive state, whereby the collecter of the transistor 121 deliver the driving voltage. Thus the operational amplifier 40, the shutter time control circuit and so on connected to the collector of this transistor 121 are brought into the operable state. Further, when the output of the detector 118 consisting for example of the Schmitt-circuit is brought into the low level state, the transistors 119 and 120 are brought into the conductive state in such a manner that the pulse-shaped voltage is applied to the first holding magnet 130 so as to release the first holding member prohibiting the upward movement of the not shown mirror so that the mirror starts to be lifted up. When the mirror starts to be lifted, the switch 37 is closed so that the aperture information memorized in the capacitor 39 is applied to the one input terminal of the comparater 44 while the not shown governer starts to operate so as to start the control of the aperture of the photographic lens. When the aperture starts to be controled, the value of the resistance is varied in accordance with the aperture value in such a manner that the information of the set aperture is delivered to the other input terminal of the comparater 44 successively. When the aperture value set at the photographic lens by means of the governer reaches the aperture information memorized in the capacitor 39, the current supply to the magnet 45 is interrupted so as not to excite the magnet 45 any more, whereby the governer stops the operation in such a manner that the aperture is set at the proper value. When the mirror is further lifted up and the not shown front shutter plane starts to run until the shutter plane reaches the end, the switch $b70$ is closed in such a manner that the charge stored in the trigger capacitor 315 in the flash light device F is discharged through the terminals $a1$, $c1$, $d7$ and $b7$ so as to actuate the discharge tube 317. The flash light emitted from the discharge tube 317 is reflected on the object and reaches the not shown film in the camera so as to start the exposure.

At this time a positive voltage of the battery 823 of the matching device M is applied to the base of the transistor 63 shown in FIG. 7 through the terminals $d8$ and $b8$, the illuminating diode 79 and the resistance 64, so that the transistors 63, 56 and 55 are in the conductive state while the transistor 54 is in the non conductive state. Thus the time controlling capacitor 49 is connected to the resistance on which the shutter time for the flash light photography is set. Thus the capacitor 49 is charged through the transistor 56 and the resistance 60 when the short circuit switch 50 is opened. When the terminal voltage of the capacitor reaches a certain determined value, the output state of the detecter 51 consisting of the Schmitt-circuit is inversed so as not to excite the magnet 52 whereby the not shown rear shutter plane starts to run while the shutter is closed. When the rear shutter plane starts to run, the safety switch 103 shown in FIG. 7 is opened while at the same time the power supply self-holding circuit is interrupted, whereby the transistors 106 and 107 are brought into the conductive state by means of the charge in the capacitor 105 in such a manner that the capacitor 110 of the self-timer and the first holding delay capacitor 117 are discharged and the initial state is restored.

As explained above, by means of providing the matching device $AD_1$, it becomes possible to match the camera CB of the latter flash light photographic device with the flash light device SA of the former flash light photographic device.

Below the second matching device for matching the flash light device SB of the latter flash light photographic device with the camera CA of the former flash light photographic device will be explained in accordance with FIGS. 3, 9, 10 and 11.

Figure 9:
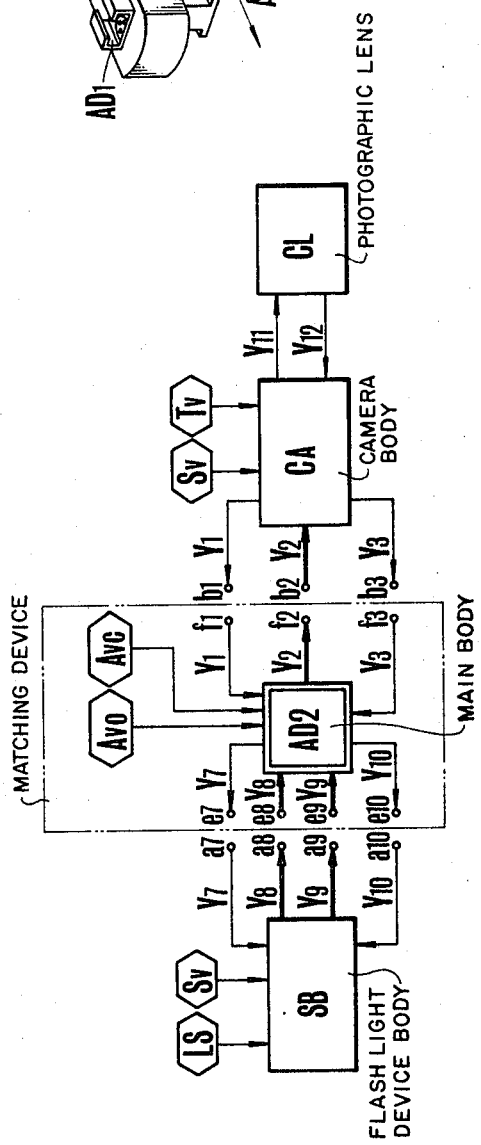
FIG. 9 shows a block circuit diagram of a second matching device.

FIG. 9 shows the block circuit diagram of the second matching device. Hereby SB is the main body of the flash light device constituting the latter flash light photographic device, whereby on this main body SB the synchronization signal terminal $a7$, the charge completion signal terminal $a8$, the aperture signal terminal $a9$ and the earthed terminal $a10$ are provided. The signal for triggering the flash light device is delivered to the synchronization signal terminal $a7$, while the charge completion signal terminal $a8$ delivers the charge completion signal when the terminal voltage of the not shown capacitor for storing the flash light energy and the aperture signal terminal $a9$ delivers the absolute aperture value signal. CA is the main body constituting the former flash light photographic device, whereby the photographic lens CL is mounted on this camera body CA. The not shown aperture value display meter is provided on the camera body CA, while on the photographic lens CL a signal member corresponding to the vignetting value information of the photographic lens to be used is provided, whereby this signal member serves to set the vignetting value signal to the meter in the camera body when the photographic lens is mounted on the camera body CA. Further on the camera body CA, the sinchronization signal terminal for delivering the synchronization signal for triggering the flash light device when the not shown shutter is totally opened, the signal terminal $b2$ and the earthed terminal $b3$ are provided. AD2 is the main body of the second matching device, whereby on the main body AD2 the synchronization signal terminal $e7$ to be connected to the synchronization terminal $a7$, the charge completion signal terminal $e8$ to be connected to the charge completion signal terminal $a7$, the aperture signal terminal $e9$ to be connected to the aperture signal terminal $a9$, the earthed terminal $e10$ to be connected to the earthed terminal $a10$, the synchronization signal terminal $f1$ to be connected to the synchronization signal terminal $b1$ at the side of the camera, the signal terminal $f2$ to be connected to the signal terminal $b2$ and the earthed terminal $f3$ to be connected to the earthed terminal $b3$ while in the main body AD2 the signal converting circuit for converting the signal given to the aperture signal terminal $e9$ into a signal suited for the camera is provided.

Below the operation of the device composed as explained above will be explained. At first the operation at the time of the daylight photography will be explained. In this case the matching device as well as the flash light device is not mounted on the camera. When the photographic lens CL is mounted on the camera body, the not shown signal member on the photographic lens rotate the meter in the camera body so as to set at the meter the vignetting value information Avc of the photographic lens to be used. This meter is further rotated in accordance with the set film sensitivity information Sv and the set shutter time information Tv. On the other hand, when the not shown photoelectric element produces a signal corresponding to the brightness of the object, the finger of the meter connected to the photoelectric element swings in accordance with the signal from the photoelectric element. Hereby the finger of the meter indicates the aperture value to be set. Further, when the shutter release button is pushed down, the position of the finger is detected so as to set the photographic lens at the aperture in accordance with this position. When the aperture has been determined, the shutter is opened for a certain determined time so as to obtain the proper exposure.

Below the operation at the time of the flash light photography will be explained. In this case the flash light device, the matching device and the camera are connected to each other as is shown in FIG. 9. When the flash light device is actuated after the respective terminals of the devices are connected to the corresponding terminals, the absolute aperture value signal |Av| is produced at the terminal a9 on the flash light device body SB. When the absolute aperture value signal |Av| is given to the not shown signal converting circuit in the matching device through the terminals a9 and e9, this signal converting circuit converts the signal given from the terminal a9 into a signal Y2 represented by means of the relation (1).

$$Y2 = Pv - (Dv + Avo + Avc - Tv) \ldots \quad (1)$$

Hereby:
 Pv : Flash light amount information corresponding to the flash light amount of the flash light device.
 Tv : Shutter time information
 Avo : Smallest F value information of the photographic lens to be used.
 Avc : Vignetting value information of the photographic lens to be used.
 Dv : Distance information corresponding to the distance between the camera and the object.

On the other hand the charge completion signal produced at the terminal a8 when the terminal voltage of the not shown capaciter provided in the flash light device body SB is applied to the signal converting circuit through the terminal e8 on the matching device AD2 in such a manner that the output signal of the signal converting circuit can be produced at the terminal f2. In consequence, when the capacitor of the flash light device has been charged, the afore mentioned signal Y2 is produced at the terminal f2. When the signal Y2 is given to the camera body CA through the terminal b2, the signal Y2 is operated with the film sensitivity information Sv, the shutter time information Tv, and the vignetting value information Avc given to the camera body in advance CA in such a manner that the finger of the meter indicates the aperture value to be determined. In accordance with the aperture value indicated by the meter the aperture is controlled while in accordance with the shutter time set in advance the opening time of the shutter is controlled in such a manner that the proper exposure can be obtained in the same way as in case of the daylight photography.

As explained above, in accordance with the present invention the matching device AD2 is provided in such a manner that the flash light device of the latter flash light photographic device can be used for the camera of the former flash light photographic device.

Below the embodiments of the present invention will be explained in accordance with FIGS. 3, 10 and 11.

Figure 3:
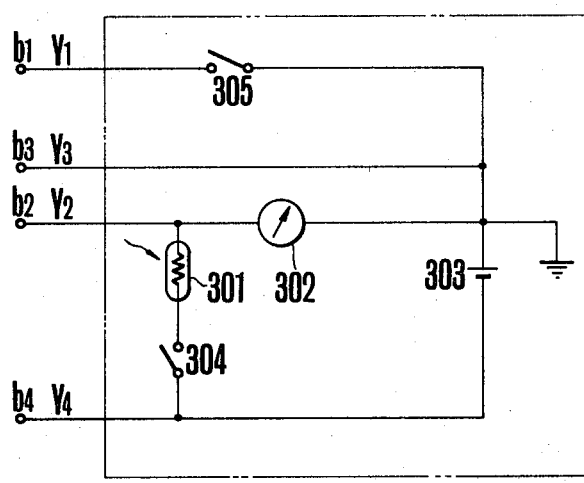

FIG. 3 shows an embodiment of the camera body CA shown in FIG. 4, whereby the explanation with reference to FIG. 3 will be made in a brief way in order to avoid the repetition of the explanation already made to the conventional flash light photographic device. In FIG. 3, 301 is the photoelectric element such as silicone photocell, CdS and so on, 302 the meter so designed as to be rotated in accordance with the set film sensitivity information Sv and the vignetting value information. 303 is the battery, 304 the main switch, 305 the synchronization signal terminal to be opened with the shutter is totally opened, $b_1$ the synchronization signal terminal, $b_2$ the signal terminal, $b_3$ the earthed terminal connected to the earth and $b_4$ the current supply terminal.

Figure 10:
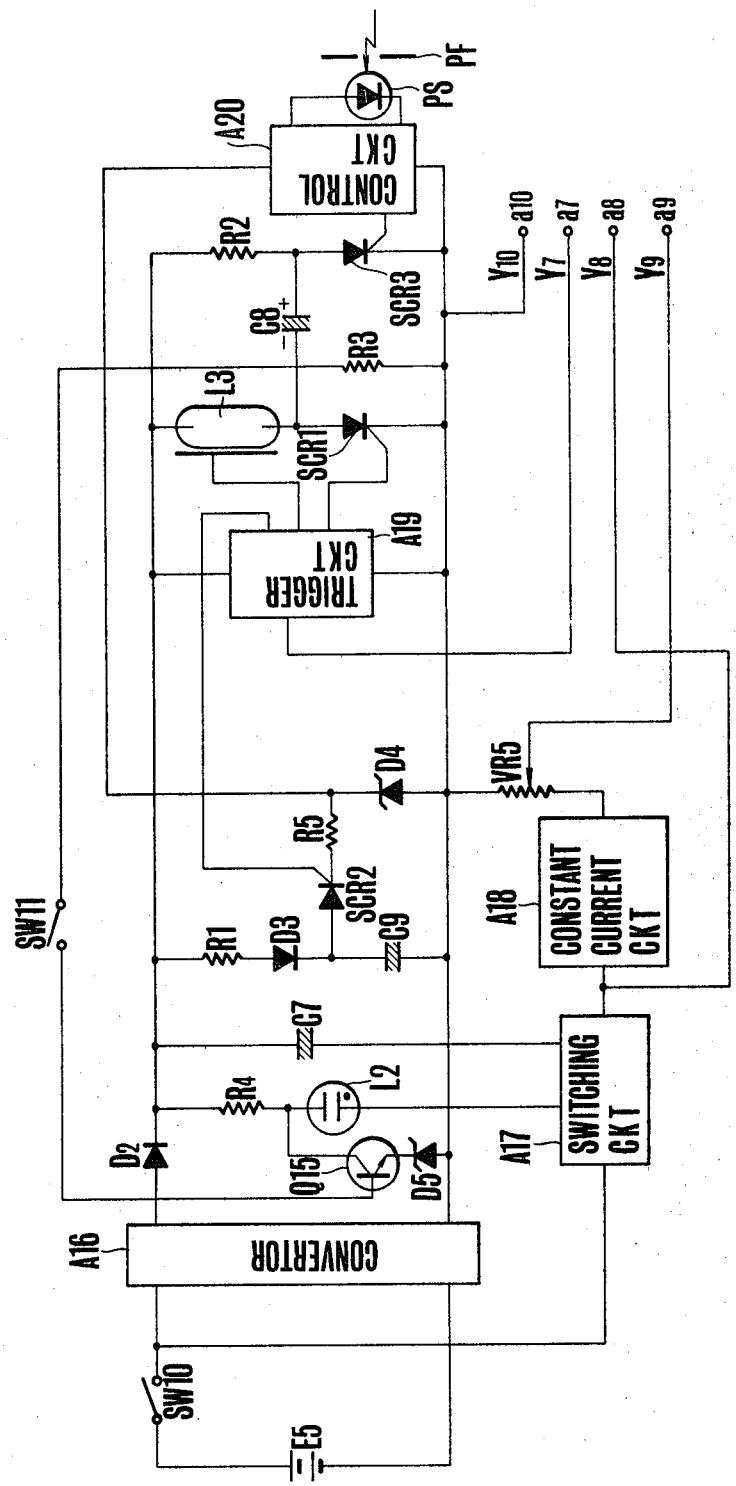
FIG. 10 shows a circuit diagram of the flash light device of the device shown in FIG. 2.

FIG. 10 shows an embodiment of the flash light device body SB shown in FIG. 4, whereby E5 is the battery, Sw10 the power source switch and A16 the power source device such as DC voltage step up circuit consisting of the transistors. D2 is the rectifying diode connected to the output terminal of the power source device A16, $C_7$ the main capacitor connected to the cathode of the diode D2, R4 the resistance connected to the one terminal of the main capacitor C7, L2 the neon tube, Q15 the nPn transistor, D5 the Zenner diode connected to the emitter of the transistor Q15, A17 the switching circuit, A18 the constant current circuit, R1 the resistance, D3 the diode, C9 the catacitor, SCR2 the thyristor whose anode is connected to the connecting point of the diode D3 and the capacitor C9, R5 the resistance, D4 the Zenner diode, VR5 the variable resistance and A19 the trigger circuit whose output terminal is connected to the trigger electrode of the discharge tube L3, the control electrode of the thyristor $SCR_1$ and the control electrode of the thyristor SCR2. $SCR_1$ is the thyristor connected in series to the discharge tube. R3 the resistance connected parallel with the thyristor $SCR_1$, C8 the capacitor, SCR3 the thyristor connected in series to the capacitor C8, R2 the resistance, A20 the flash light amount control circuit consisting of time constant circuit, PS the photoelectric element for sensing the light reflected from the object, PF the aperture member, a7 the synchronization signal terminal connected to the input terminal of the trigger-circuit A19, a8 the charge completion signal terminal connected to the output terminal of the switching circuit A17, a9 the aperture signal terminal connected to the slide member of the variable resistance VR5 and a10 the earthed terminal connected to the earth line of the flash light device.

Figure 11:
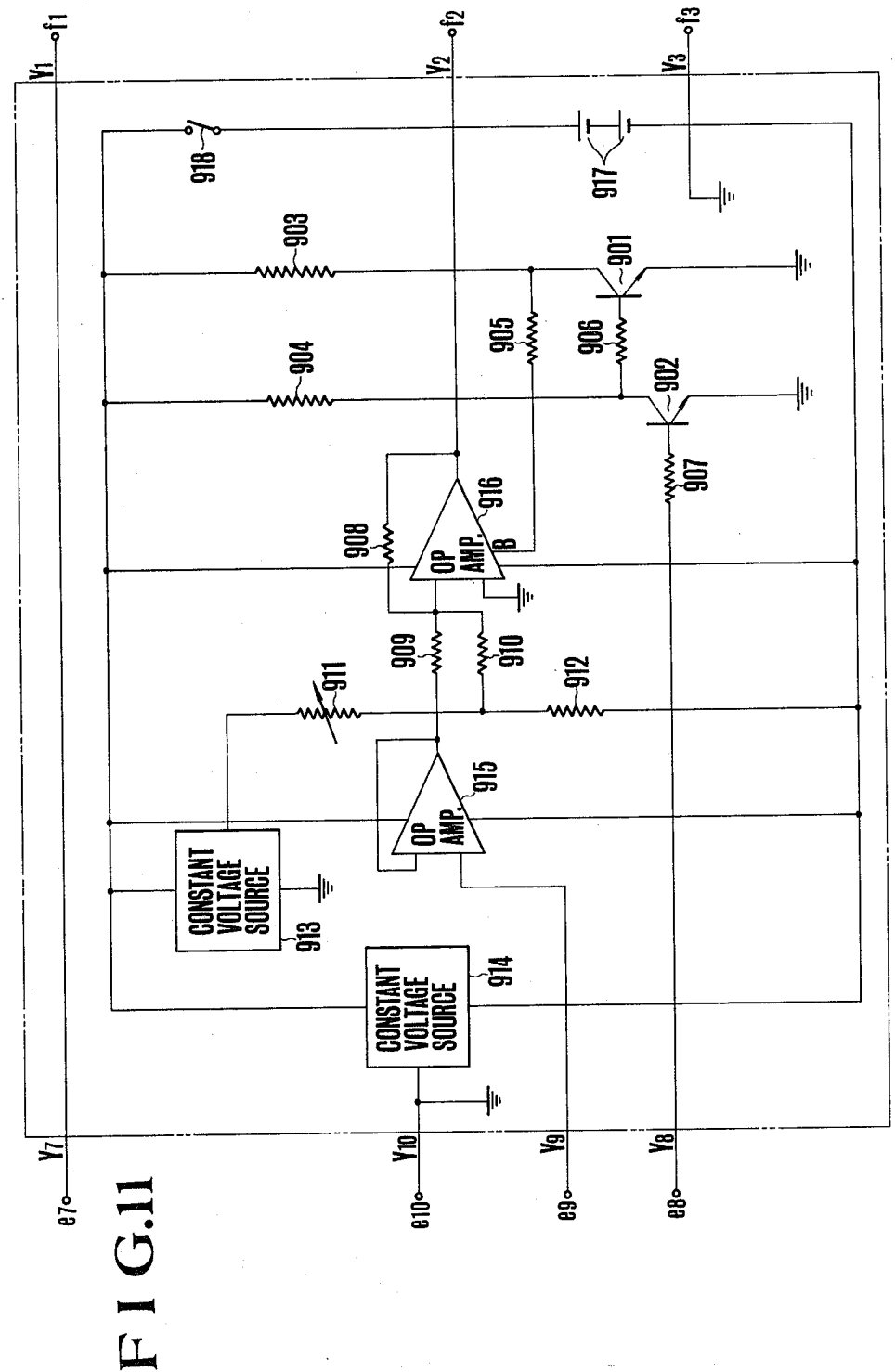
FIG. 11 shows a circuit diagram of the second matching device.

FIG. 11 shows an embodiment of the matching device AD2 shown in FIG. 9, whereby the part in the dotted line is the matching device body AD2 shown in FIG. 9. AD2 is provided with the constant voltage circuits 913 and 914 connected to the battery 917 through the power source switch 918, the operational amplifier 915 whose one input terminal is connected to the aperture signal terminal e9, the information setting resistance 911, the resistances 910 and 912, the operational amplifier 916 whose one input terminal is connected to the output terminal of the operational amplifier 915, the resistance 908 connected between the input terminal and the output terminal of the operational amplifier 916, the nPn transistor 901 and 902, the resistance 903 connected to the collecter of the transistor 901, the resistance 904 connected to the collecter of the transistor 902, the resistance 905 connected between the collecter of the transistor 901 and the switching terminal the operational amplifier 916, the resistance 906 connected between the base of the transistor 901 and the collecter of the transistor 902 and the resistance 907 connected between the base of the transistor 902 and the charge completion signal terminal e8.

On AD2, the synchronization signal terminal $e7$ to be connected to the terminal $a7$ at the side of the flash light device, the charge completion signal $e8$ to be connected to the terminal $a8$, the aperture signal terminal $e9$ to be connected to the terminal $a9$ and the earthed terminal $e10$ to be connected to the terminal $a10$ are provided. Further on AD2, the terminal $f_1$ to be connected to the terminal $b_1$ at the side of the camera, the terminal $f2$ to be connected to the terminal $b2$ and the terminal $f3$ to be connected to the terminal $b3$ are provided. Hereby the afore mentioned information setting resistance 911 is so designed that the value varies in accordance with the relation $[-(Sv - Tv + Avo + Avc)]$, whereby $Sv$ is the film sensitivity information to be set, $Tv$ the shutter time information, $Avo$ the smallest aperture value F of the photographic lens to be used and $Avc$ the vignetting value information of the photographic lens to be used.

Below the operation of the above mentioned device particularly at the time of the flash light photography will be explained in accordance with FIGS. 3, 10 and 11.

When the camera CA, the flash light device SB and the matching device AD2 are connected to each other and the power source switch Sw10 of the flash light device SB is closed, the current from the power source E5 is stepped up by means of the step up circuit A16 and rectified by means of the diode D2 into a direct current, which is delivered to the main capacitor C7 and C9 and C8, so as to charge these capacitors. When the charge voltage of the main capacitor C7 has reached a certain determined value capable of actuating the discharge tube L3, the neon tube L2 discharges in such a manner that a certain determined voltage is applied to the switching circuit A17 through the resistance R4 so as to bring the switching circuit A17 into the closed state. Further by means of the illumination of the neon tube L2 the charge completion is displayed at the side of the flash light device. When the switching circuit A17 has been brought into the switched on state, the voltage of the power source E5 is applied to the constant current circuit A18 and the charge completion signal terminal $a8$ through the switching circuit A17. Further a constant voltage is produced between the both terminals of the output load VR5 of the constant current circuit A18 in such a manner that the APEX information Y9 $(= Pv - (Dv - Sv))$ is produced at the terminal $a9$ by setting at VR5 the film sensitivity information SB and the aperture information to be determined in accordance with the change over setting of the flash light amount. The absolute aperture value signal $|Av_1| (= Pv - (Dv - Sv))$ produced at the terminal $a9$ is delivered to the one input terminal of the operational amplifier 916 through the terminal $e9$ of the matching device AD2 and the buffer amplifier 915 while the signal $[-(Sv - Tv + Avo + Avc)]$ set at the resistance 911 is also delivered to the above mentioned input terminal of the operational amplifier 916 in such a manner that the operational amplifier 916 carries out the addition of both of the above mentioned signals. It goes without saying that hereby it is supposed that the power supply switch 918 is closed while all the element of the matching device AD2 are in the operable state. On the other hand, when the charge completion signal is produced at the terminal $a8$ when the main capacitor C7 has been charged, this signal brings the transistor 902 into the conductive state and the transistor 901 into the non-conductive state through the terminal $e8$ on the matching device. Thus the switching terminal of the operational amplifier 916 is connected to the positive electrode of the battery 917 through the resistances 905 and 903 as well as the power source switch 918 in such a manner that a certain determined voltage is applied to the switching terminal B so as to bring the operational amplifier 916 into the operable state. In consequence only at this time, the output potential corresponding to Y2 $(= Pv - (Dv - Sv) + [-(Sv - Tv + Avo + Avc)] = Pv - (Dv - Tv + Avo + Avc)$, namely the addition of the above mentioned two signals applied to the input terminal of the operational amplifier 916 is produced at the output terminal f2 of the operational amplifier 916. Further, when the photographic lens is mounted on the camera, the meter 302 in the camera rotates in accordance with the vignetting value of the photographic lens and further in accordance with the film sensitivity $Sv$ and the shutter time $Tv$ in functional engagement of the setting of the film sensitivity information $Sv$. When then the above mentioned signal Y2 is applied to the meter 302 through the terminal $b2$, the meter displays the aperture value corresponding to the signals applied, namely Y2 + $(Sv - Tv + Avc) = (Pv - Dv + Sv) - Avo (= Av - Avo)$. When the shutter of the camera is released in the above mentioned state, the aperture is controled in accordance with the position of the finger of the meter 3.2. When the aperture has been controled, the synchronization switch 305 at the side of the camera CB connected to the terminal 97 is closed when the not shown shutter is totally opened, whereby the trigger circuit A19 of the flash light device is actuated through the synchronization terminals $b1$, $f1$, $e7$ and $a7$. When the trigger circuit A19 is actuated, the discharge tube L3 is triggered by means of the pulses produced by the trigger circuit A19 while the thyristers $SCR_1$ and SCR2 are also triggered and brought into the conductive state. When SCR2 is triggered, the charge stored in the capaciter C9 is applied to the Zenner diode D4, whose electrical potential is applied to the flash light amount control circuit A20 for several m.s. On the other hand the flash light emitted from L3 is reflected by the object and reaches the light sensitive element PS, whose output actuates the flash light amount control circuit A20 in such a manner that the stop signal from A20 is applied to the thyrister SCR3 at the time of the proper exposure so as to bring SCR3 in the switched on state. When SCR3 is brought into the switched on state the charge stored in the capaciter C3 runs toward $SCR_1$ along the inversed direction so as to bring $SCR_1$ in the switched off state. Thus the discharge tube L3 stops emitting the flash light. After then, the shutter is closed so as to terminate the flash light photography. As explained, the camera CB carries out the operation for the flash light photography while the flash light amount of the flash light device is controled so as to take a picture with the proper exposure.

Figure 1:
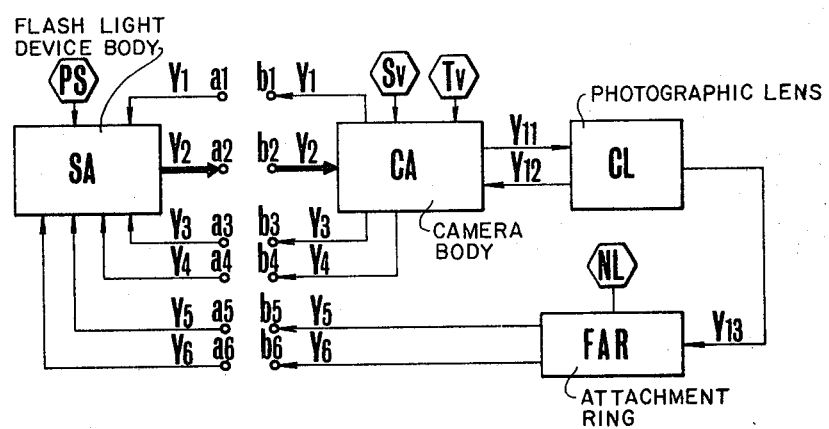
FIGS. 1 to 3 show explanatory drawings of the conventional flash light photographic devices.
Figure 2:
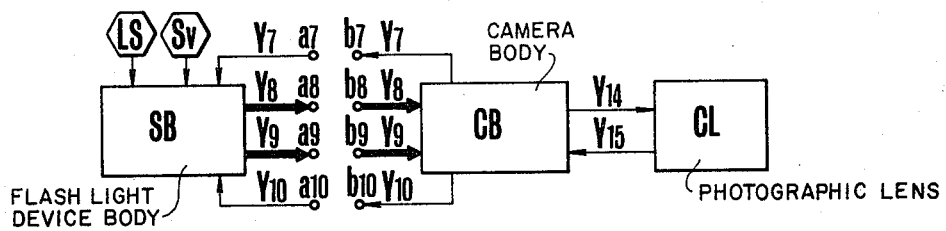

Further in case of the daylight photography by means of this device the flash light device SB and the matching device AD2 are dismounted, whereby the operation for this daylight photography is identical with that of the conventional device shown in FIG. 1, so that the explanation is omitted here.

As explained above by providing the matching device AD2 is becomes possible to match the flash light device SB of the latter flash light photographic device with the camera CA of the flash photographic device. In consequence, by providing the matching devices AD$_1$ and AD$_2$ as mentioned above the interchangeability of the photographic devices for each other can be obtained.

Figure 12:
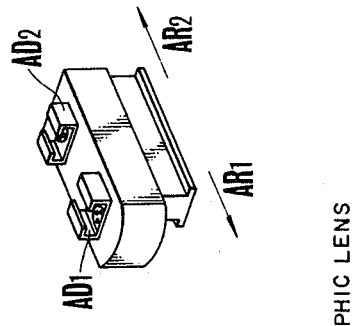
FIG. 12 shows the first and the second matching device incorporated in one unit in perspective view.

Hereby, when the two matching devices are constituted as independent units from each other as in case of the above mentioned embodiment, there is a danger that they might be lost, which is inconvenient. In case of the embodiment shown in FIG. 12, the two matching devices AD$_1$ and AD$_2$ are united into one unit. In case of this embodiment the matching device AD$_1$ is pushed along the direction of the arrow AR$_1$ when the matching device AD$_1$ is mounted on the camera CB while the matching device AD2 is pushed along the direction of the arrow AR2 when the matching device AD2 is mounted on the camera CA.

What is claimed is:

1. A matching apparatus mountable between a camera and a flash light device for the flash light device with at least a first terminal mounted on the flash light device for transferring a first signal including a diaphragm value signal and a charge completion signal and the camera with at least a second terminal mounted on the camera for receiving the diaphragm value signal and a third terminal mounted on the camera for receiving the charge completion signal comprising;
   (a) a first matching terminal mounted on the matching apparatus to be connected to the first terminal for receiving the first signal from said first terminal,
   (b) a control means for receiving the first signal through said first matching terminal so as to electrically separate the diaphragm value signal from the charge completion signal contained in the first signal, and
   (c) a second and a third matching terminal connected to an output terminal of said control means for receiving the two signals separated by means of said control means, whereby said second matching terminal being connected to the second terminal for transferring the diaphragm value signal to the second terminal of said camera while said third matching terminal being connected to the third terminal for transferring the charge completion signal to the third terminal of said camera.

2. A matching apparatus as in claim 1, wherein said control means includes an amplifier circuit connected between said first matching terminal and said second matching terminal and switching means connected between the first matching terminal and the third matching terminal.

3. An apparatus as in claim 2, wherein said first amplifier circuit includes an operational amplifier and circuit means connecting the operational amplifier between the first matching terminal and the second matching terminal.

4. An apparatus as in claim 2, wherein said switching means includes a transistor having a control electrode connected to said first matching terminal.

5. A matching apparatus mountable between a camera and a flash light device for the flash light device with at least a first terminal mounted on the flash light device for transferring a diaphragm value signal and a second terminal mounted on the flash light device for transferring a charge completion signal and a third terminal mounted on the camera for receiving a first signal including at least the diaphragm value signal and the charge completion signal comprising;
   (a) a first matching terminal mounted on the matching apparatus to be connected to the first terminal for receiving the diaphragm value signal from said first terminal,
   (b) a second matching terminal mounted on the matching apparatus to be connected to the second terminal for receiving the charge completion signal from said second terminal,
   (c) a control means for receiving the diaphragm value signal and the charge completion signal through said first matching terminal as well said second matching terminal so as to electrically unify the both signal, and
   (d) a third matching terminal mounted on the matching apparatus for transferring the electrical signal unified by means of said control means to the third terminal of said camera.

6. An apparatus as in claim 5, wherein said control means includes amplifier means connected between the first and the third matching terminal and enabling means connected between the second matching terminal and the amplifier means to enable said second amplifier means in response to the charge completion signal from the second matching terminal.

7. A matching apparatus as in claim 6, wherein said amplifier circuit includes an operational amplifier and circuit means connecting the operational amplifier between the first matching terminal and the third matching terminal.

* * * * *

UNITED STATES PATENT OFFICE
CERTIFICATE OF CORRECTION

Patent No. 4,095,242　　　　　　　　　　Dated June 13, 1978

Inventor(s) Tokuichi Tsunekawa, M. Uchidoi et al

It is certified that error appears in the above-identified patent and that said Letters Patent are hereby corrected as shown below:

In the heading of the patent [75] should read as follows:

[75] Inventors: Tokuichi Tsunekawa: Masanori Uchidoi, both of Yokohama; Zenzo Nakamura, Saitama-ken; Tetsuya Taguchi, Kanagawa-ken; Hiroshi Aizawa, Tokyo; Takashi Uchiyama, Yokohama, all of Japan Signed and Sealed this Thirty-first Day of October 1978

[SEAL]

Attest:

RUTH C. MASON
*Attesting Officer*

DONALD W. BANNER
*Commissioner of Patents and Trademarks*